United States Patent Office 2,762,685
Patented Sept. 11, 1956

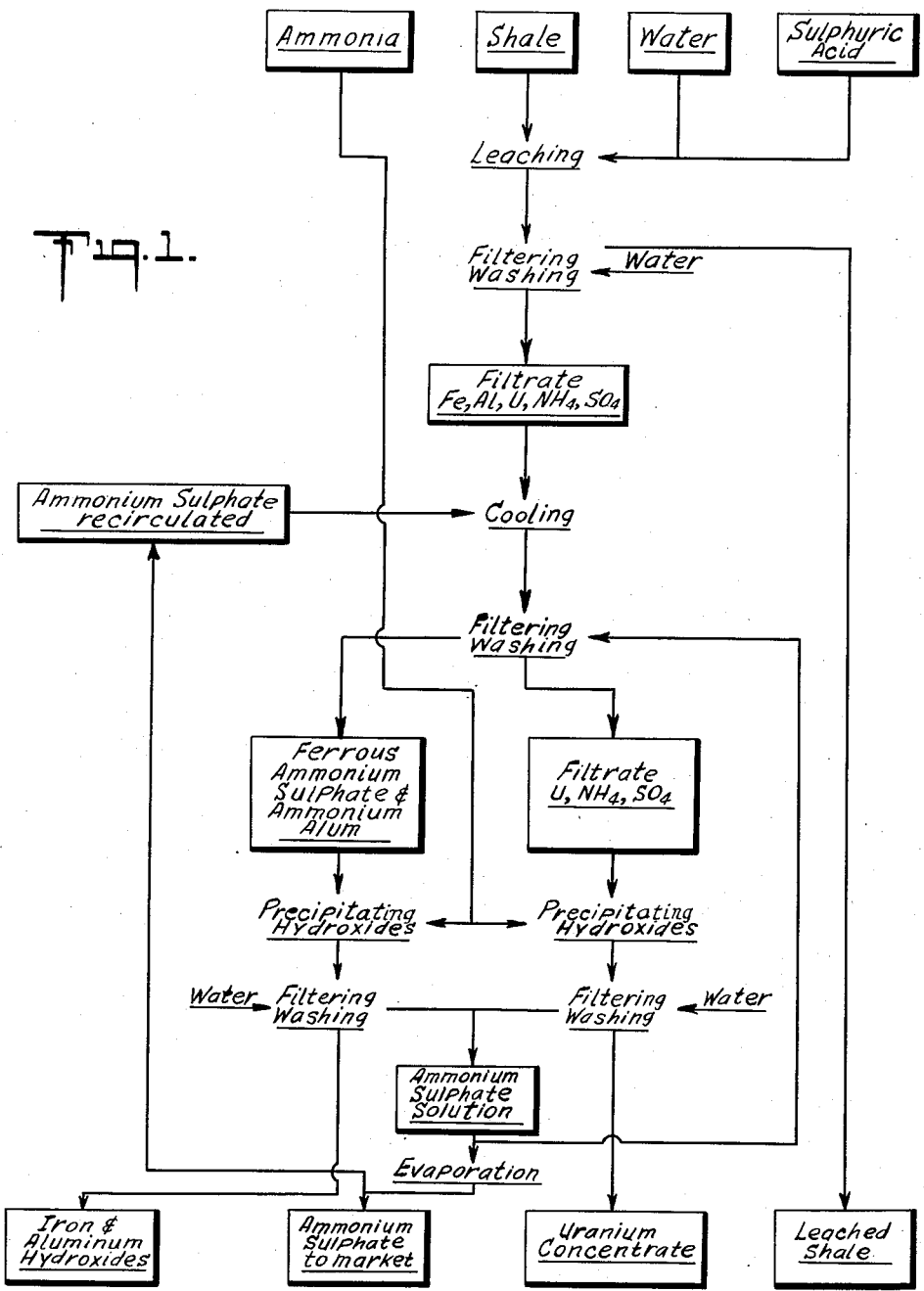

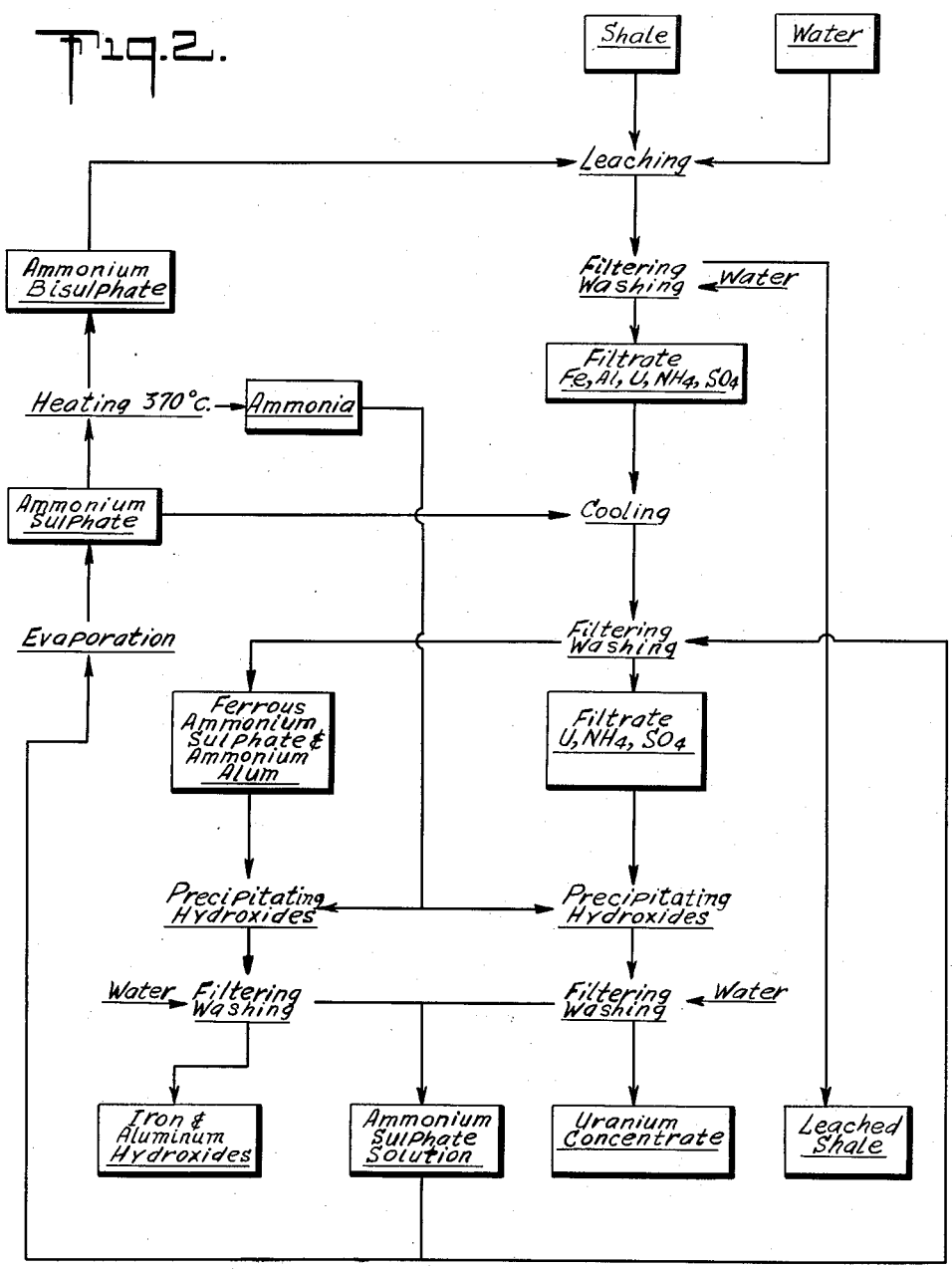

2,762,685
PROCESS FOR RECOVERY OF URANIUM AND OTHER METAL VALUES FROM SULFATE SOLUTIONS

Nils Herman Brundin, Hoganas, Sweden, assignor to Ekstrand & Tholand, Inc., New York, N. Y., a corporation of New York Application September 23, 1950, Serial No. 186,378
Claims priority, application Sweden October 18, 1949
20 Claims. (Cl. 23—14.5)

This invention involves a method of isolating uranium and practically without loss from low grade ores containing it.

It is known that in recent years the metal uranium has attained considerable importance as a source of atomic energy. A survey of the raw materials suitable as sources for isolation of uranium shows, however, that high grade uranium ores are very scarce and confined only to a few countries. In spite of intensive prospecting, it is not likely that more high grade uranium ores will be discovered. Consequently, interest must already be concentrated on recovering uranium from low grade ores such as the carnotite ores and certain shales. As the ordinary physical concentration methods in general are not effective for obtaining uranium from low grade ores, the only way to recover uranium from them is to treat such an ore with chemical reagents. Sulphuric acid is generally a suitable chemical reagent to use to treat these ores to extract uranium from them. Any vanadium present in the ores then generally also is extracted along with a part of their iron, aluminum, and magnesium content.

If then the filtrate solution, obtained after extraction of the ore with sulphuric acid, is neutralized with an alkali hydroxide, the uranium is precipitated as an alkali uranate along with hydroxides of the other metals, and in this way there is obtained a certain concentration of the uranium compared with that in the original ore. If, however, the content of uranium in the ore is small compared with that of the other metals, the concentration thus obtained from the filtrate from the sulphuric acid leaching will not be sufficient to permit an economical treatment of the combined precipitate of the uranate and the hydroxides of the other metals to yield a pure uranium compound. A method for separating uranium and vanadium from a part of the other elements is disclosed in my U. S. Patent No. 2,587,286 granted February 26, 1952, on my copending U. S. patent application Serial No. 56,658, of which this application in some of its features is a continuation-in-part.

Although the method described in the preceding paragraph gives good results with vanadium, it is, nevertheless, not suitable to the same degree for uranium as it gives a low degree of concentration for this metal if losses have to be avoided.

According to the method of the instant invention it is, however, possible to get a high grade uranium concentrate practically without any significant losses at all of the content of uranium in the starting low grade ore.

The invention is based on the experimental observation that aluminum, bivalent and trivalent iron, and magnesium are practically completely removed from solutions containing sulphates of these metals by being crystallized out of such solutions jointly as their respective double sulphates with an alkali metal sulphate or ammonium sulphate or any of them when solutions of the sulphates of these metals are saturated or at least nearly saturated with alkali metal sulphate or ammonium sulphate; whereas similar removal by such double sulphate formation and crystallization does not occur with the metal uranium. Thus, it is possible by such addition of the alkali sulphates simultaneously to remove substantially all aluminum, iron, and magnesium from a solution containing sulphates of these metals and also uranium, and to leave behind in the solution practically only the salts of the uranium and any vanadium that may have been present in, and leached from, the ore.

According to the invention, the uranium containing raw material, for example, a low grade ore is leached in such a manner, available in the art, that there is obtained a sulphate solution, that is to say, a solution combining the sulphates of uranium and of the customarily found major amounts of iron and aluminium and also of magnesium. Thereafter, to such sulphate solution, i. e., the solution of the sulphates of the foregoing metals, so much of alkali sulphate is added that substantially all the iron, aluminum, and magnesium crystallizes out, preferably after cooling, as a mixture of the double sulphates respectively of these three metals with the added alkali sulphate, while the uranium and any vanadium extracted remain behind in the solution. The precipitated, or crystallized out, double sulphates are removed or separated in known manner, for example, by centrifugation, draining, or decantation, and any mother liquor (which still contains dissolved uranium sulphate) adhering to the crystals is recovered by washing them with a concentrated solution, preferably saturated, of alkali sulphate.

At least usually it is preferable that the sulphate solution, obtained after filtering the leached ore, be saturated with the alkali sulphate. However, the method of the invention includes adding adequate alkali sulphate to throw down simultaneously substantially all the iron and aluminium as a mixture of their respective double sulphates with the alkali sulphate used. It is usually desirable that the alkali sulphate be added in an amount to give in the solution a concentration of about at least 25 per cent and from there up to saturation. The minimum required amount of alkali sulphate can readily be determined by adding measured amounts of the alkali sulphate to measured control samples and checking to see whether any more double sulphates can be thrown down from the mother liquor filtrate from them. Alternatively, similar check can be run on a control sample from the process batch after the alkali sulphate was added to it, and adding more alkali sulphate to the process batch if addition of alkali sulphate to the mother liquor from the batch sample throws down additional mixed sulphates. The aluminium and iron content of the ore starting material found by original analysis can be a help to setting the amount of alkali sulphate to use. The alkali sulphates referred to herein, as in the preceding paragraph, elsewhere and in the appending claims, is used generically and thus include not only the alkali metal sulphates, for example, sodium sulphate and potassium sulphate, but also ammonium sulphate as well.

From the mother liquor remaining after the removal of the precipitated double sulphates, and preferably from the mother liquor combined with the wash solution, the uranium is recovered by being precipitated out, along with any small amounts of iron, aluminium, any magnesium that might still remain in these solutions, by neutralizing it with an alkaline hydroxide, that is to say, an alkaline earth hydroxide, for example calcium hydroxide, or an alkali hydroxide which embraces an alkali metal hydroxide such as sodium or potassium hydroxide, and also ammonium hydroxide. While at least usually it is desirable to use a single alkaline hydroxide such as any alkali hydroxide in an individual neutralization to recover the uranium, this operation need not be restricted to the use of merely one, for a mixture of alkaline hydroxides, for example, such as of the alkaline earth hydroxides can be used.

If any bivalent iron is present, it preferably is converted to the trivalent state by compatible oxidation, say by blowing oxygen or preferably air through the mother liquor or combined mother and wash liquors, to permit definitely complete precipitation of iron.

These mixed precipitates thrown down by the alkaline hydroxide and containing the uranium compound along with the hydroxides of aluminium, iron, and magesium, are filtered off and from the filter cake pure uranium compounds are isolated and prepared by already known methods. The remaining filtrate is then suitably evaporated to recover the alkali sulphates and thereby contribute to the economy of the process.

The mixed double sulphates of iron and of aluminum respectively with alkali sulphate thrown down by the saturation of the original leach filtrate with alkali sulphate, as described above, and removed from their accompanying mother liquor are then dissolved in a suitable excess of water over that necessary to take them into solution and iron and aluminum are precipitated as mixed hydroxides from the resulting solution by adding sufficient alkali hydroxide of the type mentioned above. After filtering off the precipitated mixed hydroxides, this filtrate likewise is then suitably evaporated to recover the alkali sulphates. It is also possible to combine the filtrate obtained above after filtering off the mixed precipitates of the uranium compound and the hydroxides of iron, aluminum, and magnesium with this filtrate remaining after filtering off the hydroxides of iron and aluminum precipitated from the double sulphates, and to evaporate the combined filtrates then to recover the alkali sulphates in one combined operation.

To avoid recovering a mixture of alkali sulphates from the filtrate obtained after filtering off the mixed precipitates of the uranium concentrate with the hydroxides of iron, aluminum, and magnesium, it is preferable that the positive ion or cation of the alkali sulphate that is added to the original leach filtrate be identical with the positive ion or cation in the alkali hydroxide selected to use for precipitating that mixed precipitate of the concentrates and the hydroxides.

As a further economy, such part of the recovered alkali sulphates as is necessary to precipitate the mixed double sulphates from a new batch of original leach filtrate is used for that purpose and the remainder can then be marketed. Thus, alkali sulphate used to precipitate double sulphates is recirculated in the processing. The additional alkali sulphate recovered after precipitating hydroxides of iron and aluminum from the double sulphates separated from the treatment of the leach filtrate with the alkali sulphates can also be sold.

Also to avoid recovering a mixture of alkali sulphates from the filtrate from the precipitated hydroxides of iron and aluminum thrown down by the adidtion of alkaline hydroxide to the solution of the mixture of the double sulphates, i. e., the ferrous ammonium sulphate and alkali alum, it is preferable that the alkaline hydroxide be selected with the same cation as that of the alkali sulphate initially added to throw down the mixed double sulphates.

The invention is illustrated by, but not restricted to, the following examples:

*Example 1.*—500 grams of alum shale, containing 0.04 per cent of uranium, were ground to pass 100 percent through a 40 mesh screen and agitated with a solution of 30 grams of sulphuric acid 66° Baumé in 250 cc. of water, during one hour at 98–100° C. After filtering the resulting leach mixture and washing the insoluble residue with a minimum sufficient amount of water, 200 grams of ammonium sulphate were added to and stirred into the hot filtrate solution (now 325 cc.), and the whole was cooled down to 14° C. The crystallized salts (mainly ammonium alum and ferrous ammonium sulphate) were separated from the solution by filtering and washed with a saturated ammonium sulphate solution. To the mother liquor filtrate combined with the wash liquor, ammonia was added until an alkaline reaction was shown, thereupon the resulting precipitate was separated from the solution by filtering, and was washed and dried. The dry precipitate ("Precipitate 1") weighed 1.8 grams.

The mixture of ammonium alum and ferrous ammonium sulphate (the crystallized salts mentioned above) was dissolved in hot water, and precipitated with ammonia. The precipitate ("Precipitate 2") was separated from the solution by filtering and was then washed, dried, and weighed 15.7 grams.

The two dry precipitates were analyzed with the following results:

|  | Precipitate (1.8 gr.) | Precipitate 2 (15.7 gr.) |
| --- | --- | --- |
|  | *Percent* | *Percent* |
| $SiO_2$ | 9.7 | 0.0 |
| $Al_2O_3$ | 45.8 | 20.1 |
| $Fe_2O_3$ | 11.4 | 54.2 |
| Uranium | 9.5 | 0.004 |
| Loss in ignition | 17.4 | 22.2 |

A simple calculation shows that 0.17 gram of uranium was obtained in the concentrate, and that only 0.4% of the uranium content in the solution was lost in Precipitate 2.

From the combined solutions ammonium sulphate was recovered by evaporation.

The flowsheet for such a process as in Example 1 is given in Fig. 1 wherein it is shown that the raw starting material is leached with diluted sulphuric acid and ammonium sulphate is used to precipitate the double salts and amonium hydroxide to precipitate iron and aluminum as hydroxides and together with them to precipitate the uranium concentrate.

Of course, in place of the sulphuric acid, a solution of an alkali bisulphate, such as ammonium bisulphate, can be used for leaching the ore (as in Example 2 below). Furthermore, it is also possible instead to heat the ore with such a bisulphate and afterwards leach it will water (as seen in Example 3 below).

However, in the process according to Example 1, the amount of sulphuric acid consumed is on a large scale considerable, and as the selling price of ammonium sulphate generally is lower than the cost of its components, ammonia and sulphuric acid, the process will be charged with a fairly high cost of chemicals. This cost can be reduced considerably if the raw material, still according to the invention, as shown in the following example and illustrated by the flowsheet in Fig. 2, is leached with a water solution of ammonium bisulphate and not with diluted sulphuric acid.

*Example 2.*—1,000 grams of the same alum shale as used in Example 1 were agitated with a solution of 140 grams of ammonium bisulphate in 500 grams of water, during one hour at 98–100° C. After filtering the resulting leach mixture and washing the insoluble residue with a minimum sufficient amount of water, 320 grams of ammonium sulphate were added to the hot filtrate solution, which then was cooled to 5° C. The crystallized out double sulphates were separated from the mother liquor solution by filtering and washed with a saturated solution of ammonium sulphate. The metal content of this filtrate solution combined with the wash solution was precipitated out with ammonia and the resulting uranium concentrate and hydroxides precipitate was recovered by filtering, washed and then dried. The dry precipitate weighed 1.7 grams and contained 19.5% of uranium.

The mixture of double sulphates crystallized out of the leach filtrate was disolved in hot water and its iron and aluminum content precipitated out as mixed hydroxides by the addition of ammonia while blowing air through the solution. The precipitate was separated from the solution, washed and dried. It weighed 17 grams and contained 0.004% of uranium.

The combined filtrate solutions were evaporated to dryness, and from the ammonium sulphate obtained ammonium bisulphate and ammonia were regenerated by heating 175 grams to 375° C. As ammonium sulphate was used for precipitation of the double salts and ammonium hydroxide for the neutralizations, all filtrates were obtained as ammonium sulphate solutions. Then since from the ammonium sulphate obtained when these solutions were evaporated, ammonium bisulphate and ammonia for use in the process thus were regenerated, the process then theoretically can be used without consumption of chemicals.

Instead of leaching the raw material with a solution of ammonium bisulphate, it is possible, of course, to heat it to 200–400° C. with ammonium sulphate or ammonium bisulphate and afterwards to leach the resulting mass with water.

Example 3.—500 grams of the same alum shale as used in Examples 1 and 2 were thoroughly mixed with 150 grams of ammonium sulphate, and heated at 375° C. until evolution of ammonia ceased.

The resulting mass was placed into 250 cc. of hot water and agitated. After filtering and washing, 160 grams of ammonium sulphate were added to the filtrate, which then was cooled down to 10° C. The crystallized out double sulphates were separated from the mother liquor solution by filtering and washed with a saturated solution of ammonium sulphate. The mother liquor solution combined with the wash solution was neutralized with ammonia and the resulting precipitate was recovered by filtering and weighed after washing and drying. Its weight was 1.5 grams and its uranium content 10.2%.

The mixture of double sulphates was dissolved in hot water and the iron and aluminum precipitated out with ammonia while air was blown through the solution. The precipitate was separated from the solution, washed, dried and weighed. The weight was 15 grams and the uranium content 0.003%.

While ammonium sulphate has been used in the foregoing examples to throw down the mixture of double sulphates, it can be replaced in any of them by any other alkali sulphate such as any of the alkali metal sulphates. Likewise, while ammonia (representing ammonium hydroxide) has been used as the alkaline hydroxide in the particular respective step in the examples, it also can be replaced by any other alkaline hydroxide, for example, any of the alkali metal hydroxides. In any such substitutions, it is helpful to be guided by the advantage obtained by selecting the alkaline hydroxide with the same cation as that of the alkali sulphate used.

Moreover, any vanadium contained in any ore material along with the uranium will be carried along with the latter in the various steps mentioned in the examples as in the foregoing general description of the invention.

In the cyclic processes referred to above and shown in the flowsheets of Figures 1 and 2, it is also a part of the invention that the uranium concentrate need not be precipitated by addition of alkali hydroxide to the filtrate from the separation of the double sulphates in each individual batch. Instead that filtrate can be evaporated with the uranium still in solution, or even after being precipitated, and the resulting alkali sulphate with the entrained uranium used as the reagent alkali sulphate added to the ore leach filtrate sulphate solution in a succeeding batch to precipitate the double sulphates of iron and aluminum with alkali sulphate from it. In this manner, it is possible without losses further to concentrate uranium in solution and then only to carry out the precipitation with alkali hydroxide when the concentration of the two metals has reached a desired value.

It is possible also to isolate alumina as a by-product of the processes described above, for example by one of the following methods:

(a) The mixed hydroxides resulting when the separated mixed double sulphates are dissolved in water and their solution treated with alkali hydroxide to precipitate these mixed hydroxides of aluminum and iron, are digested with an excess of the alkali hydroxide, for example, sodium hydroxite. This excess dissolves the aluminum hydroxide from the mixed precipitates. The undissolved ferric (or mixed ferrous and ferric) hydroxide and any magnesium hydroxide are filtered off, or otherwise removed, and alumina recovered from the sodium aluminate filtrate in conventional manner.

(b) The mixture of double sulphates separated from the leach filtrate sulphate solution after having saturated it with alkali sulphate, is dissolved preferably in a minimum amount of water, and the aluminum-alkali-sulphate is separated by recrystallization from the ferrous-alkali-sulphate which remains in solution as the latter is the more soluble of the two. The then separated aluminum double sulphate is disolved in a minimum amount of water and alkali hydroxide added to its solution to precipitate aluminum hydroxide which is filtered off and calcined to give alumina.

The expression water-insoluble forms of said metals as used herein and in the appending claims includes the metals and insoluble compounds of the metals.

While the invention has been described in relation to certain specific embodiments of it, it is understood that substitutions and modifications can be made in it within the scope of the appending claims which are intended to cover also equivalents.

What is claimed is:

1. The method of recovering uranium as its sulphate, from an aqueous solution thereof along with the sulphates of at least one of the metals aluminum, iron, and magnesium, which method comprises, before removing any aluminum, iron, and magnesium originally contained in the solution, adding to it in solid form at least one alkali sulphate and dissolving it solely in the water of the aqueous solution, until its concentration is so high that the aqueous solution is from nearly saturated to saturated with the alkali sulphate so that at least substantially all of the aluminum, iron and magnesium present in the solution crystallizes out of solution simultaneously as the double sulphate respectively of each of these last three metals present with the cation of the alkali sulphate thus added, whereby whatever uranium was originally present in the solution remains dissolved therein, and removing the crystallized out mixture of double sulphates.

2. The method as claimed in claim 1, wherein the separated crystals of the double sulphates are washed with a concentrated solution of alkali sulphate to remove adhering mother liquor solution containing dissolved uranium.

3. The method as claimed in claim 1, wherein to the filtrate from the separated precipitated double sulphates, there is added an alkaline hydroxide, inert to the metals mentioned in claim 1, and in an amount to precipitate the uranium present and along with it also as the corresponding hydroxides what small amount, if any, of the other metals mentioned in claim 1, remained after throwing down the double sulphates, and separating the resulting precipitate.

4. A method as claimed in claim 3, wherein the filtrate remaining after removing the precipitate thrown down by the alkali hydroxide from one batch is concentrated to recover the alkali sulphate and the thus recovered alkali sulphate is added to a fresh batch of original leach sulphate solution, containing sulphates of the metals as originally referred to in claim 1, and in quantity to produce in said fresh batch of solution sufficiently high concentration of alkali sulphate whereby aluminum, iron and magnesium present therein are precipitated as double sulphates of said metals, while the uranium originally present in the solution remains in solution, and removing the precipitated double sulphates.

5. A method as claimed in claim 1, wherein the solution remaining after separation of the precipitated double sulphates from one batch is concentrated even up to evaporation to dryness to yield a mixture containing the alkali sulphate and the compounds of the uranium, and said mixture is added to a fresh batch of original leach filtrate sulphate solution containing the original sulphates of the metals referred to in claim 1 to produce in said fresh batch of solution sufficiently high concentration of alkali sulphate whereby aluminum, iron, and magnesium present therein are precipitated as double sulphates of said metals, while the uranium originally present in the solution remains in solution and in a higher concentration than originally present, and removing the precipitated double sulphates.

6. A method as claimed in claim 5, wherein to the first filtrate remaining after removing the first batch of precipitated double sulphates, before concentrating said filtrate an alkaline hydroxide is added in quantity to neutralize said filtrate.

7. A method as claimed in claim 6, wherein the cation of the alkali sulphate used to precipitate the double sulphates is identical with the cation of the alkaline hydroxide used.

8. The method as claimed in claim 1, wherein the separated double sulphates of said at least some of the metals aluminum, iron, and magnesium are taken up in an aqueous medium and said metals re-precipitated as their corresponding hydroxides by addition of alkali hydroxide, and removing the precipitated metal hydroxides.

9. The method as claimed in claim 8, wherein the solution remaining after the separation of metal hydroxides is concentrated even up to evaporation to dryness to yield alkali sulphates and at least part of said recovered alkali sulphates are added to a fresh batch of original leach filtrate sulphate solution containing the original sulphates of the metals referred to in claim 1.

10. The method as claimed in claim 8, wherein the separated mixture of double sulphates of said at least some of the metals aluminum, iron and magnesium are taken up in an aqueous medium and said metals re-precipitated as their corresponding hydroxides by an alkali hydroxide having the same cation as the cation of the alkali sulphate added to the initial solution to precipitate the double sulphates of the metals with the alkali sulphate.

11. The method as claimed in claim 8, wherein the separated double salts of said at least some of the metals aluminum, iron, and magnesium are taken up in an aqueous medium and any ferrous ions present are oxidized to ferric ions, and said metals are re-precipitated as their corresponding hydroxides by alkali hydroxide, and separating the precipitated metal hydroxides.

12. The method as claimed in claim 8, wherein the separated mixed hydroxides are treated with sufficient alkali hydroxide to dissolve the aluminum hydroxide as the alkali aluminate and the other undissolved hydroxides are filtered off, and to the alkali aluminate filtrate acid is added to reduce the alkalinity sufficiently to precipitate aluminum hydroxide which is then removed and heated to convert it to alumina.

13. The method as claimed in claim 1, wherein the removed mixed double sulphates are dissolved in at least a minimum of water and the aluminium alkali sulphate is separated from the mixed sulphates by re-crystallization from the resulting solution.

14. A method as claimed in claim 1, wherein the aqueous solution containing the sulphates of the respective metals, as covered by said claim, is obtained by treating a starting material containing water-insoluble forms of said metals, with an agent adapted to form a sulphate salt of said metals and selected from the class consisting of dilute sulphuric acid, an alkali acid sulphate, and an alkali sulphate convertible on heating to an alkali acid sulphate.

15. A method as claimed in claim 14, wherein the aqueous solution containing the sulphates is obtained by leaching an ore containing uranium with an aqueous solution selected from the class consisting of dilute sulphuric acid and an aqueous solution of an alkali acid sulphate.

16. A method as claimed in claim 14, wherein the aqueous solution containing the sulphates is obtained by admixing an ore containing uranium with a member of the class of alkali metal acid sulphates, ammonium acid sulphate, and ammonium sulphate, heating the mixture, and thereafter leaching out with water the resulting sulphates of the metals contained in the ore from the mass obtained from the heating.

17. A method as claimed in claim 16, wherein the ore is heated with ammonium acid sulphate, and ammonium sulphate is added to the leach filtrate sulphate solution to throw down the double sulphates of the metals iron and aluminium, and ammonia is used to precipitate the uranium concentrate and hydroxides of other metals from the mother liquor remaining from removing the mixed double sulphates, and ammonium sulphate is recovered by evaporating the filtrate from removing said concentrate and hydroxides and said recovered ammonium sulphate is heated to decompose it into ammonia and ammonium acid sulphate and the latter is used in extracting the metals as sulphates from a new batch of ore and the ammonia thus regenerated is used to precipitate the uranium concentrate and hydroxides of other metals from the filtrate obtained after removing the mixed double sulphates.

18. A method as claimed in claim 15, wherein the ore is leached with a water solution of ammonium acid sulphate and ammonium sulphate is added to the leached filtrate sulphate solution to throw down the double sulphates of the metals iron and aluminium, and ammonia is used to precipitate the uranium concentrate and hydroxides of other metals from the mother liquor remaining from removing the mixed double sulphates, and ammonium sulphate is recovered by evaporating the filtrate from removing said concentrate and hydroxides and said recovered ammonium sulphate is heated to decompose it into ammonia and ammonium acid sulphate and the latter is used in extracting the metals as sulphates from a new batch of ore and the ammonia thus regenerated is used to precipitate the uranium concentrate and hydroxides of other metals from the filtrate obtained after removing the mixed double sulphates.

19. The method of recovering uranium from a low grade uranium ore, along with any vanadium contained in the ore, which comprises treating the ore with a decomposing and leaching agent adapted to convert these metals to their water-soluble sulphates and any of the metals aluminum, iron, and magnesium present in the ore also to their respective water-soluble sulphates, separating all of said water-soluble sulphates in aqueous solution from the water-insoluble residues of the ore, then adding to the water solution of said sulphates at least one alkali sulphate in solid form and dissolving it in the water of the solution until its concentration therein exceeds twenty-five percent and is so high that at least substantially all of the aluminum, iron, and magnesium present in the solution crystallizes out of solution in one step simultaneously as the double sulphate respectively of each of these last three metals present with the cation of the alkali sulphate thus added, whereby the uranium and whatever vanadium was present in the solution remains dissolved therein, then removing the crystallized out mixture of double sulphates, and recovering the uranium from the mother liquor.

20. The method of recovering uranium as claimed in claim 19, wherein the alkali sulphate added to the aqueous solution of the sulphates of the metals is ammonium sulphate.

References Cited in the file of this patent

UNITED STATES PATENTS

| | | |
|---|---|---|
| 1,616,250 | Bassett | Feb. 1, 1927 |
| 1,804,631 | McKee | May 12, 1931 |
| 2,160,148 | Hunyady | May 30, 1939 |
| 2,176,609 | McCormack | Oct. 17, 1939 |
| 2,176,610 | Stamberg | Oct. 17, 1939 |